(12) United States Patent
Yun

(10) Patent No.: US 10,277,657 B2
(45) Date of Patent: Apr. 30, 2019

(54) VIRTUAL BROWSING METHOD USING APPLICATION AND OPERATION SERVER

(71) Applicant: TERUTEN, INC., Seoul (KR)

(72) Inventor: Seokgu Yun, Seoul (KR)

(73) Assignee: TERUTEN, INC., Seoul (KR)

( * ) Notice: Subject to any disclaimer, the term of this patent is extended or adjusted under 35 U.S.C. 154(b) by 313 days.

(21) Appl. No.: 14/715,815

(22) Filed: May 19, 2015

(65) Prior Publication Data

US 2016/0315994 A1 Oct. 27, 2016

(30) Foreign Application Priority Data

Apr. 22, 2015 (KR) ......................... 10-2015-0056770

(51) Int. Cl.
| | | |
|---|---|---|
| H04L 29/08 | (2006.01) | |
| G06F 21/62 | (2013.01) | |
| G06F 21/82 | (2013.01) | |
| H04W 4/00 | (2018.01) | |

(52) U.S. Cl.
CPC .......... H04L 67/02 (2013.01); G06F 21/6218 (2013.01); G06F 21/82 (2013.01); H04W 4/00 (2013.01)

(58) Field of Classification Search
CPC ...................................................... H04L 67/02
See application file for complete search history.

(56) References Cited

U.S. PATENT DOCUMENTS

| | | | | |
|---|---|---|---|---|
| 6,092,196 A | * | 7/2000 | Reiche | G06F 21/41 705/52 |
| 6,731,756 B1 | * | 5/2004 | Pizano | H04N 21/44004 348/E7.061 |
| 2002/0059463 A1 | * | 5/2002 | Goldstein | H04L 67/06 709/247 |
| 2009/0210293 A1 | * | 8/2009 | Steele | G06Q 10/00 705/64 |
| 2010/0287270 A1 | * | 11/2010 | Hashimoto | H04L 12/66 709/223 |
| 2011/0083193 A1 | * | 4/2011 | Howcroft | G06F 21/10 726/27 |
| 2014/0053054 A1 | * | 2/2014 | Shen | G06F 17/30905 715/234 |
| 2014/0082138 A1 | * | 3/2014 | Ogura | H04L 67/1097 709/217 |

* cited by examiner

*Primary Examiner* — Jason D Recek

(57) ABSTRACT

A web browsing method using an operation server is provided. The web browsing method makes it possible to view contents without installing a dedicated application program necessary for downloading the content from the website and to automatically log-in the website without performing a log-in operation by the user terminal, using a system including a user terminal, a web server managing a website and the operation server.

8 Claims, 8 Drawing Sheets

FIG. 3

| User ID | Website URL | ID | Password |
|---------|-------------|-----|----------|
| UID1 | URL1 | ID1 | PW1 |
| UID2 | URL2 | ID2 | PW2 |
| UID3 | URL3 | ID3 | PW3 |
| ⋮ | ⋮ | ⋮ | ⋮ |
| UIDm | URLm | IDm | PWm |

VIRTUAL BROWSING METHOD USING APPLICATION AND OPERATION SERVER

CROSS-REFERENCE TO RELATED APPLICATION

This application claims priority under 35 U.S.C. § 119(a) from Korean Patent Application No. 10-2015-0056770 filed on Apr. 22, 2015, the disclosure of which is hereby incorporated by reference in its entirety.

BACKGROUND

Embodiments of the present inventive concept relate to a web browsing method, and more particularly to a method of browsing a website using an application installed in a user terminal and an operation server that is connected between the user terminal and a web server managing a website and provides a function of automatically logging in the website.

A number of websites on the internet attract members and provide a service by the website. A user can join the website as a member, and can be provided with a service by logging in the website with an input of log-in information such as an ID and a password. As the user joins more websites, the user has trouble remembering and directly inputting all of the log-in information.

Most of recent websites are forced to install a dedicated application program such as an Active-X™ control or a plug-in program in a user terminal, respectively, when a user accesses each of the websites. The dedicated application programs installed in the user terminal are performed, and thereby the user can be provided with contents and/or services from the website A user needs to undergo a process of downloading and installing the dedicated application programs from a web server managing the website so as to be provided with the contents and/or the services from the website. Moreover, since the dedicated application programs to be installed are various according to each of the websites, a resource of a user terminal is unnecessarily wasted. In addition, when downloading and installing the dedicated application programs from the web server, a security level of the user terminal is intended to be temporarily lowered in some cases. Accordingly, this can be a potential threat of a security in the user terminal.

SUMMARY

A technical object of the present inventive concepts is to provide a web browsing method using an operation server in which dedicated application programs for downloading or using contents of a website are installed to virtually embody a web browsing environment and which can provide a function of automatically logging in the website, and an application which is installed in a user terminal accessing the operation server to be performed and receives a browsing result virtually embodied in the operation server.

An exemplary embodiment of the present inventive concepts is directed to a web browsing method using an operation server that, using a system which includes a user terminal, a web server managing a website, and the operation server connected between the web server and the user terminal, can view contents provided from the website without installing a dedicated application program necessary for downloading the contents from the website in the user terminal, and automatically log-in the website without performing a log-in operation by the user terminal. The method comprises receiving, by the operation server, user information from the user terminal to load a log-in information table corresponding to the user information from a database accessed by the operation server, accessing, by the operation server, the website using a URL of the website received from the user terminal, automatically logging-in the website using log-in information on the website among a plurality of log-in information included in the loaded log-in information table, downloading, by the operation server, a first content provided from the website based on a result of the log-in using the dedicated application program to generate a first browsing image by virtually browsing the downloaded first content, and transmitting, by the operation server, the first browsing image to the user terminal.

According to an exemplary embodiment, the accessing the website includes downloading, by the operation server, the dedicated application program from the web server, and installing, by the operation server, the downloaded dedicated application program in the operation server.

The method further includes, when a user input is input to the user terminal through an input interface included in the user terminal, receiving, by the operation server, the user input from the user terminal, processing, by the operation server, the received user input to generate a second browsing image based on a result of the processing, and transmitting, by the operation server, the generated second browsing image to the user terminal.

According to an exemplary embodiment, the generating the second browsing image includes analyzing, by the operation server, the received user input to request a second content corresponding to a result of the analysis to the website, downloading, by the operation server, the second content from the website using the dedicated application program to generate the second browsing image by virtually browsing the downloaded second content.

The user information includes an ID and a password which allow the user terminal to log-in the operation server.

An exemplary embodiment of the present inventive concepts is directed to a web browsing method using an application installed in the user terminal that can view contents from a website using an operation server without installing a dedicated application program necessary for downloading the contents from the website, and automatically log-in the website using the operation server without logging-in the website, including transmitting, by the application, user information to the operation server so that the operation server loads a log-in information table corresponding to the user information from a database, transmitting, by the application, a URL of the website to the operation server, and when the operation server accesses the website using the URL, automatically logs-in the website using log-in information corresponding to the website among a plurality of log-in information included in the loaded log-in information table, receives a first content provided from the website based on a result of the log-in, and generates a first browsing image by virtually browsing the received first content, receiving, by the application, the first browsing image from the operation server, and displaying, by the application, the received first browsing image on a display included in the user terminal using a content viewer embedded in the application.

According to an exemplary embodiment, the displaying further includes preventing, by the application, the first browsing image from being captured using a security module embedded in the application.

The method further includes receiving, by the application, a user input which is input through an input interface included in the user terminal using a user input coupling module embedded in the application, transmitting, by the application, the received user input to the operation server and when the operation server analyzes the received user input to request a second content corresponding to a result of the analysis to the website, receives the second content provided from the website using the dedicated application program, and generates a second browsing image by virtually browsing the received second content, receiving, by the application, the second browsing image from the operation server, and displaying, by the application, the received second browsing image.

The method further includes securing, by the application, the user input using a security module embedded in the application, and preventing, by the application, the second browsing image from being captured using the security module.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3 schematically shows an exemplary embodiment of the log-in information table shown in FIG. 1.

DETAILED DESCRIPTION OF THE EMBODIMENTS

Figure 1:
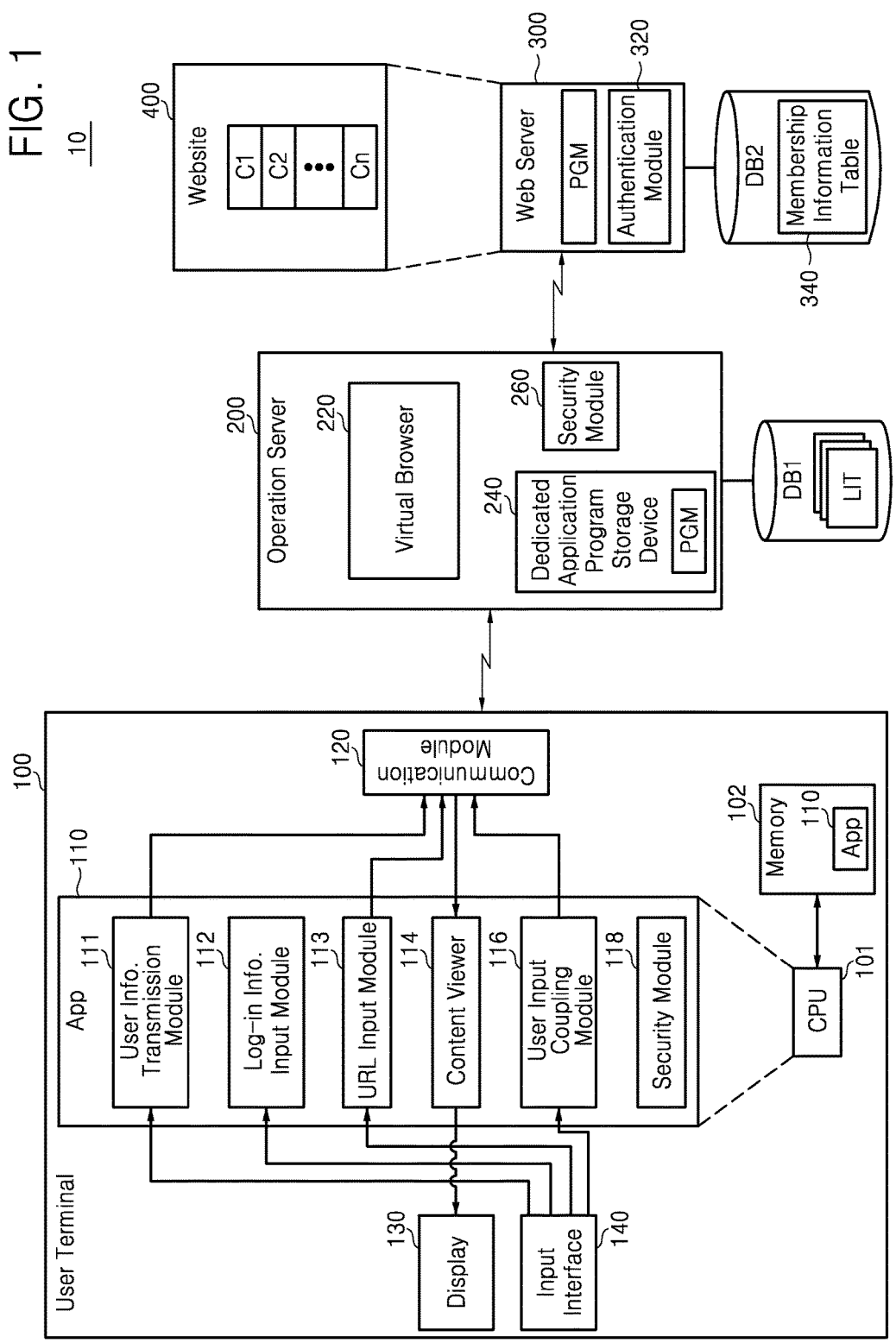
FIG. 1 is a schematic block diagram of a browsing system performing a web browsing method according to an exemplary embodiment of the present inventive concepts.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic block diagram of a browsing system which performs a web browsing method according to an exemplary embodiment of the present inventive concepts. Referring to FIG. 1, a browsing system 10 performing a web browsing method according to an exemplary embodiment of the present inventive concepts may include a user terminal 100, an operation server 200, and a web server 300.

The user terminal 100 may store a browsing application (application program or app) 110 which can perform the web browsing method according to an exemplary embodiment of the present inventive concepts, and perform a role of transmitting or receiving data or signals to or from the operation server 200.

The user terminal 100 may be embodied in a PC, a note-book PC, or a mobile computing device. The mobile computing device may be embodied in a smart phone, a tablet PC, a mobile phone, a personal digital assistant (PDA), a mobile internet device (MID), an enterprise digital assistant (EDA), a personal navigation device or portable navigation device (PND), an internet of things (IoT) device, an internet of everything (IoE) device, or a wearable device.

The user terminal 100 may include a CPU 101, a memory 102, a communication module 120, a display 130, and an input interface 140. The CPU 101 may control an operation of at least one of configuration elements 102, 120, 130, and 140 included in the user terminal 100. According to an exemplary embodiment, the CPU 101 may be embodied in an application processor (AP) and a mobile AP; however, it is not limited to thereto.

The CPU 101 may perform a browsing application 110 stored in the memory 102. The memory 102 may store commands and/or a plurality of applications necessary for an operation of the CPU 101. In particular, the memory 102 may store the browsing application 110 according to an exemplary embodiment of the present inventive concepts.

According to an exemplary embodiment, the memory 102 may operate as an operational memory of the CPU 101, and may be embodied in a dynamic random access memory (DRAM) or a static RAM (SRAM). According to another exemplary embodiment, the memory 102 may be embodied in a flash-based memory. The flash-based memory may be embodied in a multimedia card (MC), an embedded MMC (eMMC), a universal flash storage (UFS), or a solid state drive (SSD).

The memory 102 may be understood as a collective meaning which includes one or more memories. The browsing application 110 which is stored in the memory 102 and is performed by the CPU 101 may embed (include) a user information transmission module 111, a log-in information input module 112, a uniform resource locator (URL) input module 113, a content viewer 114, a user input coupling module 116, and a security module 118.

The user information transmission module 111 may receive user information that a user inputs through the input interface 140, and transmit the received user information to the operation server 200 through the communication module 120. According to an exemplary embodiment, the user information transmission module 111 may automatically transmit user information set in advance in the user information transmission module 111 to the operation server 200 when the browsing application 110 is performed.

According to an exemplary embodiment, the user information may include an ID and a password for logging-in the operation server 200; however, it is not limited thereto. For example, the user information may be information for identifying the user terminal 100 or the user. For example, when the user terminal 100 is a PC, the user information may be an internet protocol (IP) address, and when the user terminal 100 is a smart phone, the user information may be a telephone number of the user terminal 100.

The log-in information input module 112 may provide a user interface through which the user stores log-in information on at least one website in a first database DB1 accessed by the operation server 200. The log-in information input module 112 may transmit the input log-in information to the operation server 200 through the communication module 120 when the user inputs the log-in information through the input interface 140 using the user interface. The transmitted log-in information may be stored in a log-in information table (LIT) of the first database DB1. An exemplary embodiment of the user interface will be described in detail referring to FIG. 2.

The URL input module 113 may receive a URL of a website 400 to access through the input interface 140, and transmit the received URL to the operation server 200 through the communication module 120.

When a browsing image transmitted from the operation server 200 is received by the user terminal 100 through the communication module 120, the content viewer 114 can view the received browsing image. That is, the content viewer 114 may transmit the browsing image to the display 130 so that the browsing image is displayed on the display 130. According to an exemplary embodiment, the content viewer 114 may display a graphic user interface (GUI) through which a user input based on the browsing image is input on the display 130.

When a user input is received through the input interface 140, the user input coupling module 116 may transmit the received user input to the operation server 200 through the communication module 120. For example, the user input may be a keyboard input, a mouse input, a touch input, and/or a voice input; however, it is not limited thereto.

The security module 118 may include a system sensing module which senses hacking and/or abnormality of the user terminal 100, a screen capture prevention module which prevents a screen capture of the browsing image displayed on the display 130, and/or a user input security module which performs a security operation on the user input received through the input interface 140.

For example, the user input security module may be a keyboard security module, a mouse security module, a voice input security module, and/or a touch input security module; however, it is not limited thereto. According to an exemplary embodiment, the security operation may be an operation of encoding the user input or an operation of preventing another application from hooking the user input; however, it is not limited thereto.

The browsing application 110 is embedded with the security module 118, and may resolve a security problem of the user terminal 100 which can be generated when a dedicated application program PGM related to the website 400 is a security program.

The communication module 120 may transmit a URL or a user input which is input through the input interface 140 to the operation server 200, or receive a browsing image transmitted from the operation server 200. The communication module 120 may be embodied in a wired communication method and/or a wireless communication method. The wireless communication method may include long term evolution (LTE™), wideband code division multiple access (W-CDMA), and Wi-Fi.

The display 130 may display a browsing image received from the operation server 200 according to a control of the content viewer 114. According to an exemplary embodiment, the display 130 may display the GUI received from the content viewer 114. For example, the display 130 may be embodied in a thin film transistor-liquid crystal display (TFT-LCD), a light emitting diode (LED) display, an organic LED (OLED) display, an active-matrix OLED (AMOLED) display, or a flexible display.

The input interface 140 may transmit user information input by a user to a user information transmission module 111, transmit log-in information to the log-in information input module 112, transmit a URL to the URL input module 113, or transmit a user input to the user input coupling module 116. According to an exemplary embodiment, the input interface 140 may be embodied in a keyboard, a mouse, a microphone, and/or a touch panel; however, it is not limited thereto.

The operation server 200 may be connected to each of the user terminal 100 and the web server 300, virtually browse contents C1 to Cn, where n is a natural number, of the website 400, and transmit a browsing image that a browsing result is generated in an image form to the user terminal 100. According to an exemplary embodiment, the contents C1 to Cn may be web pages included in the website 400.

The operation server 200 may include a virtual browser 220, a dedicated application program storage device 240, and a security module 260.

The virtual browser 220 may play a role of virtually browsing the contents C1 to Cn downloaded from the website 400 by accessing the website 400 or a web server 300 instead of the user terminal 100. That is, the virtual browser 220 may access the website 400 corresponding to a URL using the URL received from the user terminal 100, and download at least one of the contents C1 to Cn from the website 400. The virtual browser 220 may virtually browse the at least one content which is downloaded from the website 400, and transmit a browsing image generated according to a result of the browsing to the user terminal 100. For example, the browsing image may be an image for one of a plurality of web-pages of the website 400; however, it is not limited thereto.

Each of the contents C1 to Cn may be a web-page, and each type of contents (e.g., still image content and video content) included in the web-page; however, it is not limited thereto.

According to an exemplary embodiment, when a user input is received from the user terminal 100, the virtual browser 220 may analyze the received user input and request a content corresponding to a result of the analysis to the website 400. When the content corresponding to the result of the analysis is downloaded from the website 400, the virtual browser 220 may virtually browse the content and transmit a browsing image generated according to a result of the browsing to the user terminal 100.

The dedicated application program storage device 240 may store at least one dedicated application program related to each of a plurality of websites. The operation server 200 may download a dedicated application program PGM for using the contents C1 to Cn of the website 400 from the web server 300, and install the downloaded dedicated application program PGM in the dedicated application program storage device 240.

The dedicated application program PGM may be an activeX™ control or a plug-in program for using or downloading the contents C1 to Cn of the website 400; however, it is not limited thereto. The dedicated application program PGM installed in the dedicated application program storage device 240 may be performed by a call of the web server 300 after the virtual browser 220 accesses the website 400, and the virtual browser 220 may download or use the contents C1 to Cn using the dedicated application program PGM which is performed.

The virtual browser 220 may load the log-in information table LIT corresponding to user information of the user terminal 100 from the first database DB1 accessed by the operation server 200. The virtual browser 220 may automatically log-in the website 400 using the log-in information on the website 400 corresponding to a URL transmitted from the user terminal 100 among log-in information on a plurality of websites included in the log-in information table LIT.

The dedicated application program storage device 240 may be embodied in a non-volatile memory. For example, the dedicated application program storage device 240 may be embodied in a hard disk drive (HDD) or a solid state drive (SSD); however, it is not limited thereto. Even if it is shown that the dedicated application program storage device 240 is included in the operation server 200 in FIG. 1, the dedicated application program storage device 240 may be embodied in a database accessible by the operation server 200 according to an exemplary embodiment.

The security module 260 may perform a security operation on the log-in information table LIT loaded to the virtual browser 220. For example, the security operation may be an operation of encoding log-in information included in the log-in information table LIT or an operation of preventing another program from hooking the log-in information table LIT; however, it is not limited thereto.

The web server 300 managing the website 400 calls a dedicated application program PGM installed in the operation server 200 accessing the website 400, and when the dedicated application program PGM is not installed in the operation server 200, the web server 300 transmits the dedicated application program PGM to the operation server 200 to cause the dedicated application program PGM to be installed in the operation server 200.

An authentication module 320 included in the web server 300 may perform an authentication operation on log-in information received from the operation server 200 using a plurality of log-in information stored in a membership information table 340 of a second database DB2 accessed by the web server 300. When log-in information coincident with the log-in information received from the operation server 200 is present among the plurality of log-in information, the operation server 200 may log-in the website 400.

Even if only one user terminal 100 is shown and only one virtual browser 220 is shown in FIG. 1, but the browsing system 10 may include a plurality of user terminals and the operation server 200 may include a plurality of virtual browsers according to an exemplary embodiment. When the browsing system 10 includes the plurality of user terminals, the operation server 200 may provide each of the plurality of user terminals with a web-browsing service using each of the plurality of virtual browsers corresponding to each of the plurality of user terminals.

According to another exemplary embodiment, when the user terminal 100 accesses a plurality of websites, the operation server 200 may provide the user terminal 100 with a web-browsing service for each of the plurality of websites at the same time by using each of the plurality of virtual browsers corresponding to each f the plurality of websites.

Figure 2:
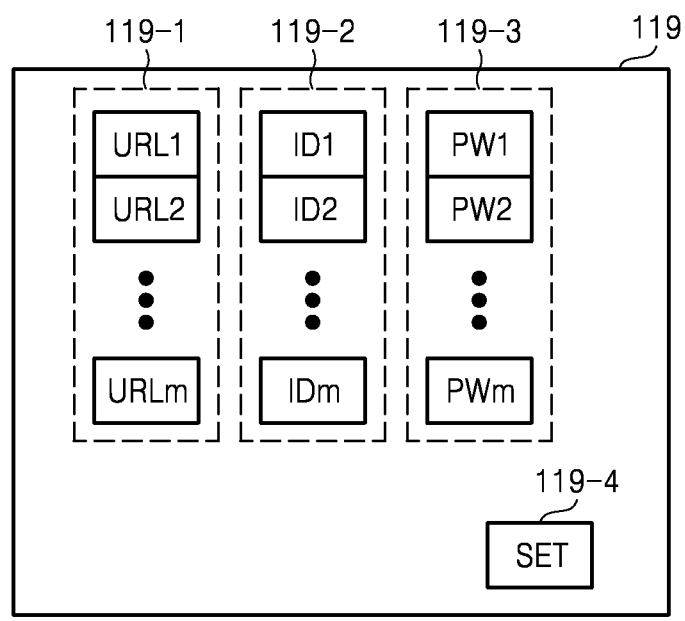
FIG. 2 is an exemplary embodiment of a user interface for generating a log-in information table stored in a first database using an user terminal shown in FIG. 1.
Figure 4:
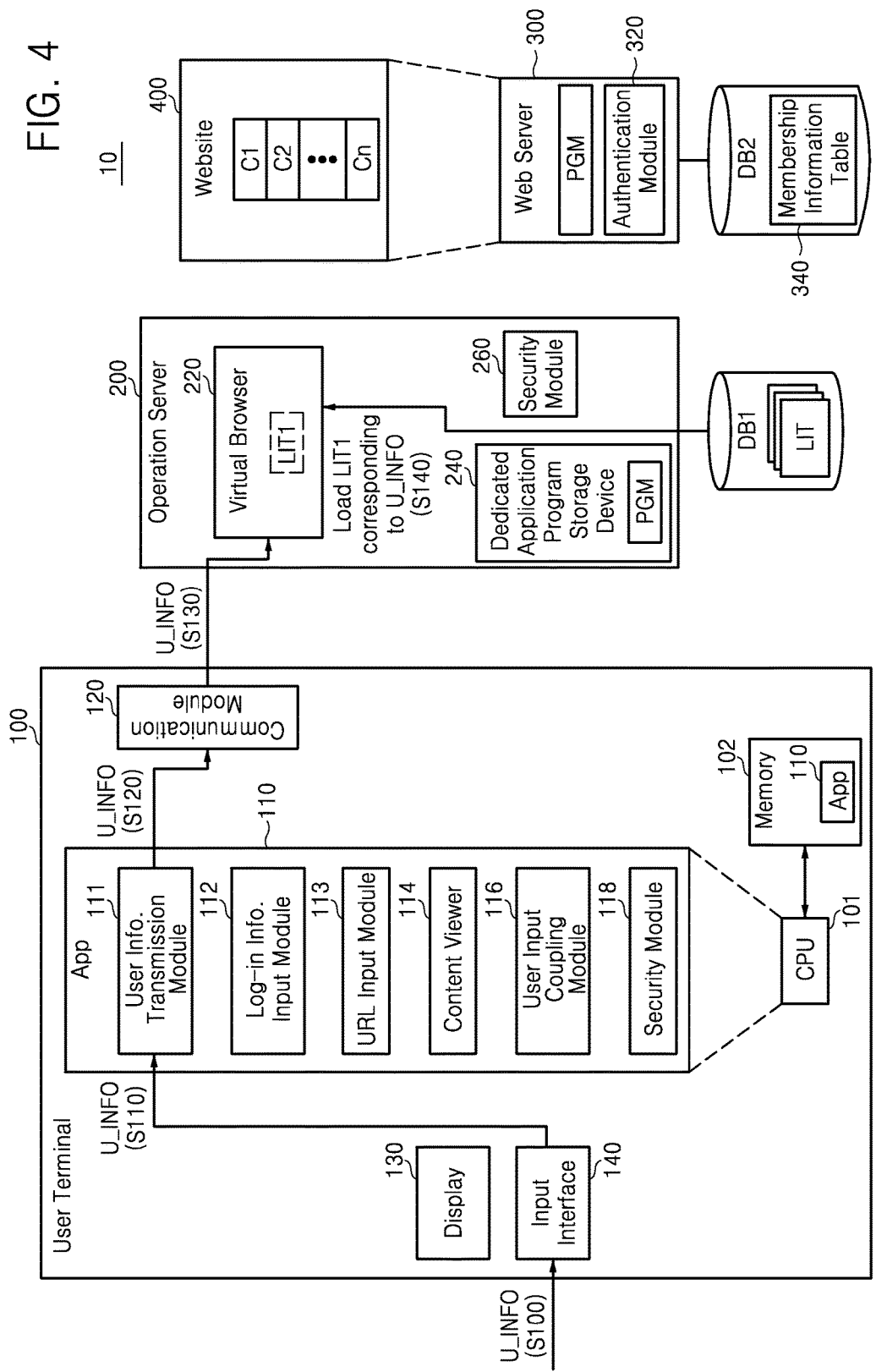
FIGS. 4 to 8 are data flowcharts which describe a web-browsing method according to exemplary embodiments of the present inventive concepts.

FIG. 2 is an exemplary embodiment of a user interface for generating a log-in information table stored in a first database using the user terminal shown in FIG. 1.

Referring to FIGS. 1 and 2, a user interface 119 provided by the log-in information input module 112 may include a URL input window 119-1 which inputs a URL of at least one website, an ID input window 119-2 which inputs an ID of each of the at least one URL, and a password input window 119-3 which inputs a password corresponding to the ID.

A user may input at least one URL, at least one ID, and at least one password into each of the windows 119-1 to 119-3. When a setting window 119-4 is selected by the user, log-in information which includes the at least one URL, the at least one ID, and the at least one password that are input into each of the windows 119-1 to 119-3 may be transmitted to the operation server 200 through the communication module 120.

The operation server 200 may store the received log-in information in a log-in information table corresponding to the user (or user information) among a plurality of log-in information tables LIT included in the first database DB1. Even if it is shown that the user can input a plurality of URLs URL1 to URLm, where m is a natural number, a plurality of IDs ID1 to IDm, and a plurality of passwords PW1 to PWm into the user interface 119 in FIG. 2; however, a structure of the user interface 119 may be variously changed according to an exemplary embodiment.

FIG. 3 schematically shows an exemplary embodiment of the log-in information table shown in FIG. 1. A log-in information table LIT shown in FIG. 3 is not more than an exemplary embodiment for convenience of description, a structure or a configuration of the log-in information table LIT is not limited thereto, but may be freely modified within a predictable range by a general technician.

Referring to FIGS. 1 to 3, the log-in information table LIT may include a website URL field 274, an ID field 276, and a password field 278.

At least one URL, at least one ID, and at least one password which a user inputs using the interface 119 shown in FIG. 2 may be stored in the log-in information table LIT. The website URL field 274 may store a URL (or an address: URL1 to URLm) of at least one website.

The ID field 276 may store at least one ID ID1 to IDm for each of the URL1 to URLm of the at least one website, and the password field 278 may store at least one password PW1 to PWm for each of the at least one ID ID1 to IDm.

According to an exemplary embodiment, when the log-in information table LIT stores log-in information on a plurality of user terminals at the same time, the log-in information table LIT may include a user ID field 272 which stores user information of each of the plurality of user terminals.

Each of user IDs UID1 to UIDm included in the user ID field 272 may be an ID for an access of each of the plurality of user terminals to the operation server 200, or a telephone number or an IP address of each of the plurality of user terminals; however, it is not limited thereto.

FIGS. 4 to 8 are data flowcharts which describe a web browsing method according to exemplary embodiments of the present inventive concepts. Referring to FIGS. 1 to 4, when the browsing application 110 is performed and user inputs user information U_INFO is input through the input interface 140 (S100), the user information transmission module 111 included in the browsing application 110 may receive user information U_INFO (S110). The user information transmission module 111 may transmit the received user information U_INFO to the virtual browser 220 of the operation server 200 through the communication module 120 (S120 to S130). For example, the user information U_INFO may include an ID and a password for an access to the operation server 200.

According to an exemplary embodiment, when the browsing application 110 is performed, the user information transmission module 111 may automatically transmit user information U_INFO set in advance in the browsing application 110 to the operation server 200.

The virtual browser 220 may load a log-in information table (for example, a first log-in information table LIT1) corresponding to the received user information U_INFO from the first database DB1 among a plurality of log-in information tables LIT stored in the first database DB1 accessed by the operation server 200 (S140). The security module 260 included in the operation server 200 may encode the loaded first log-in information table LIT1, or prevent another program from hooking the first log-in information table LIT1.

Figure 5:
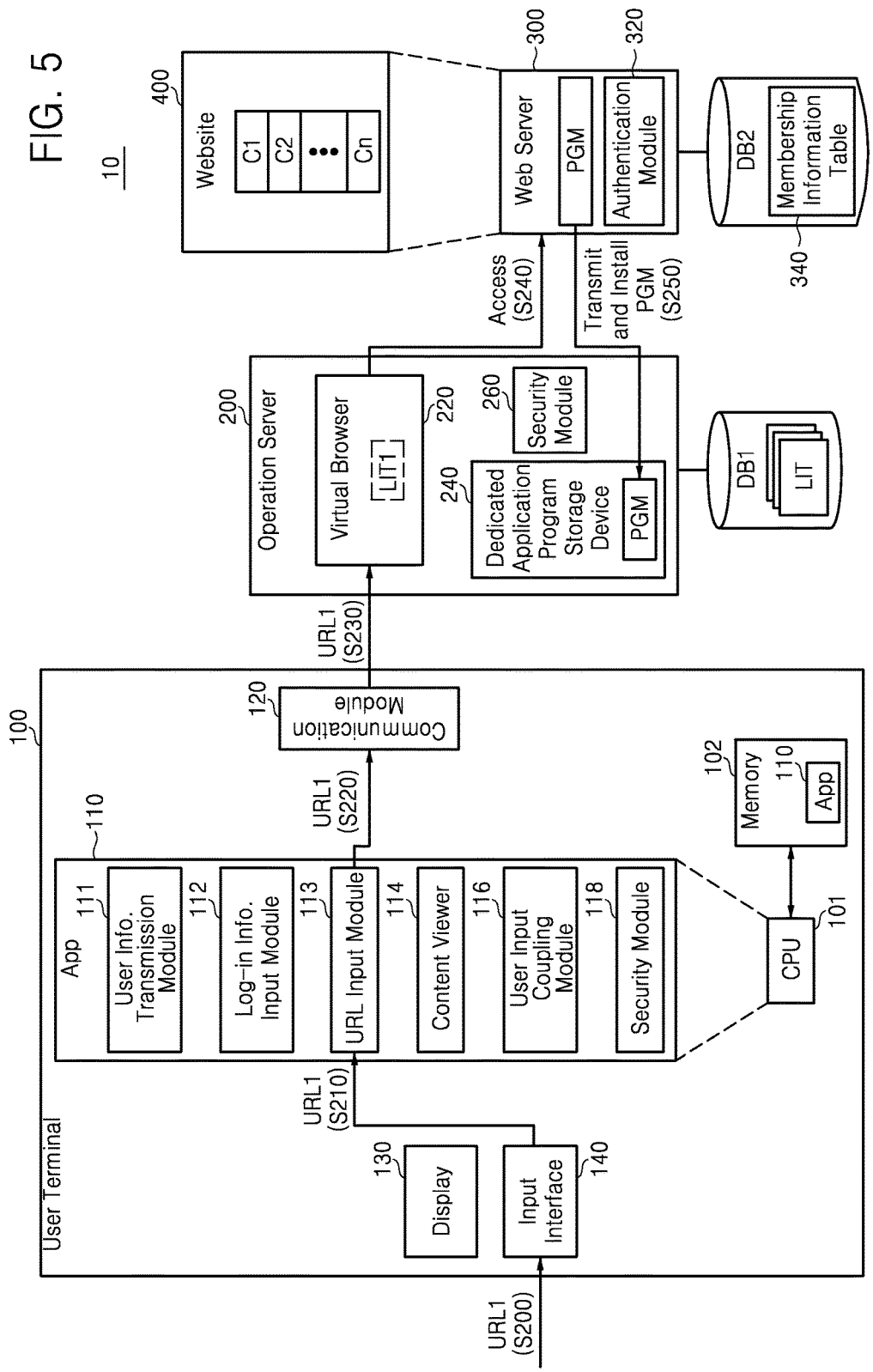

Referring to FIG. 5, when a user inputs a URL URL1 of the website 400 to access through the input interface 140, the input interface 140 transmits the URL URL1 to the URL input module 113 (S210), and the URL input module 113 may transmit the URL URL1 to the operation server 200 through the communication module 120 (S220 to S230). The virtual browser 220 may access the web server 300 which manages the website 400 corresponding to the received URL URL1 (S240).

The web server 300 may call the dedicated application program PGM of the operation server 200 so as to provide the virtual browser 220 with the contents C1 to Cn of the website 400 according to an access by the virtual browser 220. As a result of the call, when the dedicated application program PGM is not installed in the operation server 200, the web server 300 may transmit the dedication application program PGM to the operation server 200, and the transmitted dedicated application program PGM may be installed in the dedicated application program storage device 240 included in the operation server 200 (S250). That is, when the dedicated application program PGM related to the website 400 is not installed in the operation server 200, the operation server 200 cannot download or use the contents C1 to Cn of the website 400.

Figure 6:
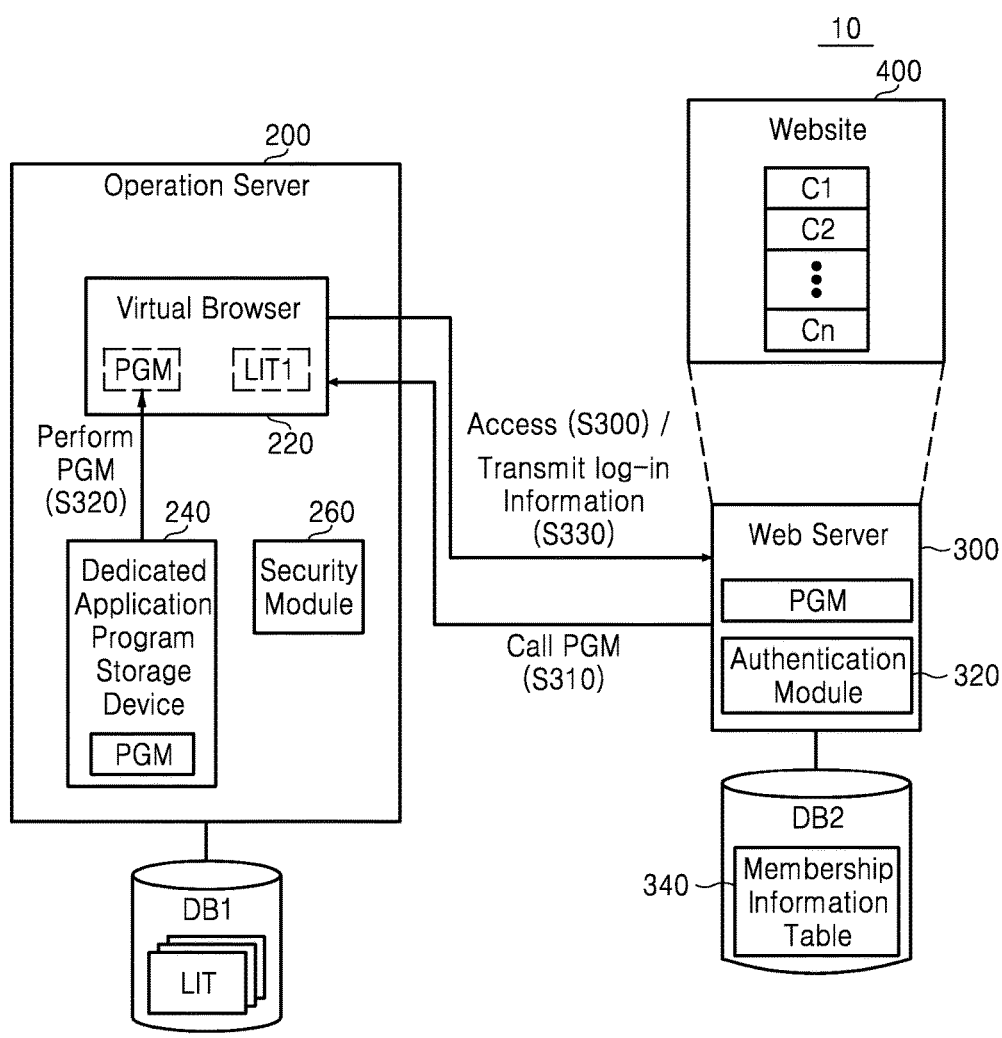

Referring to FIG. 6, when the dedicated application program PGM is installed in the operation server 200 and the virtual browser 220 accesses the web server 300 (S300), the web server 300 may call the dedicated application program PGM (S310). The virtual browser 220 may load and perform the dedicated application program PGM stored in the dedicated application program storage device 240 in response to the call (S320). The virtual browser 220 may transmit log-in information on the website 400 to the web server 300 among a plurality of log-in information included in the first log-in information table LIT1 loaded from the first database DB1 (S330).

Figure 7:
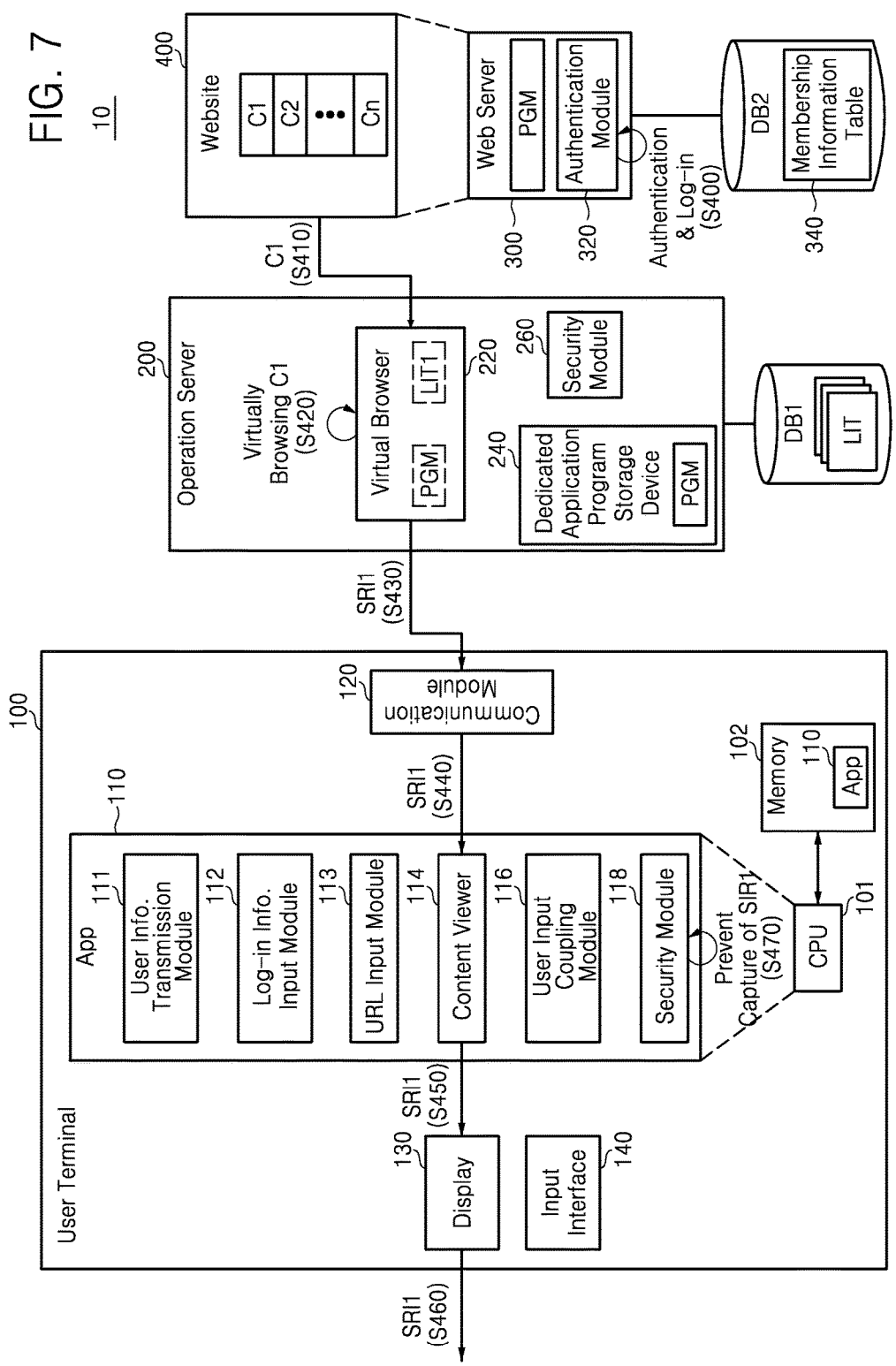

Referring to FIG. 7, the authentication module 320 included in the web server 300 may perform an authentication operation on the log-in information received from the virtual browser 220 using the membership information table 340 included in the second database DB2 accessed by the web server 300 (S400). As a result of the authentication operation, when log-in information corresponding to the log-in information is present among a plurality of log-in information included in the membership information table 340, the virtual browser 220 may log-in the web server 300 or the website 400.

The website 400 may transmit a first content C1 among the plurality of contents C1 to Cn to the virtual browser 220 in response to a log-in of the virtual browser 220 (S410). The virtual browser 220 may download the first content C1 transmitted from the website 400 using the dedicated application program PGM.

The virtual browser 220 may virtually browse the downloaded first content C1 (S420), and generate a first browsing image SRI1 based a result of the browsing. For example, the first browsing image SRI1 may be a web-page corresponding to the first content C1 among a plurality of web pages of the website 400; however, it is not limited thereto.

The virtual browser 220 may transmit the generated first browsing image SRI1 to the content viewer 114 included in the virtual browsing application 110 through the communication module 120 (S430 to S440). The content viewer 114 may transmit the first browsing image SRI1 to the display 130 for a view, and the display 130 may display the received first browsing image SRI1 (S450 to S460). According to an exemplary embodiment, the content viewer 114 may transmit GUI for a user input which can be input by a user based on the first browsing image SRI1 to the display 130, and the display 130 may display the first browsing image SRI1 and the GUI.

The security module 118 included in the virtual browsing application 110 may perform a security operation which prevents a screen capture of the displayed first browsing image SRI1.

Figure 8:
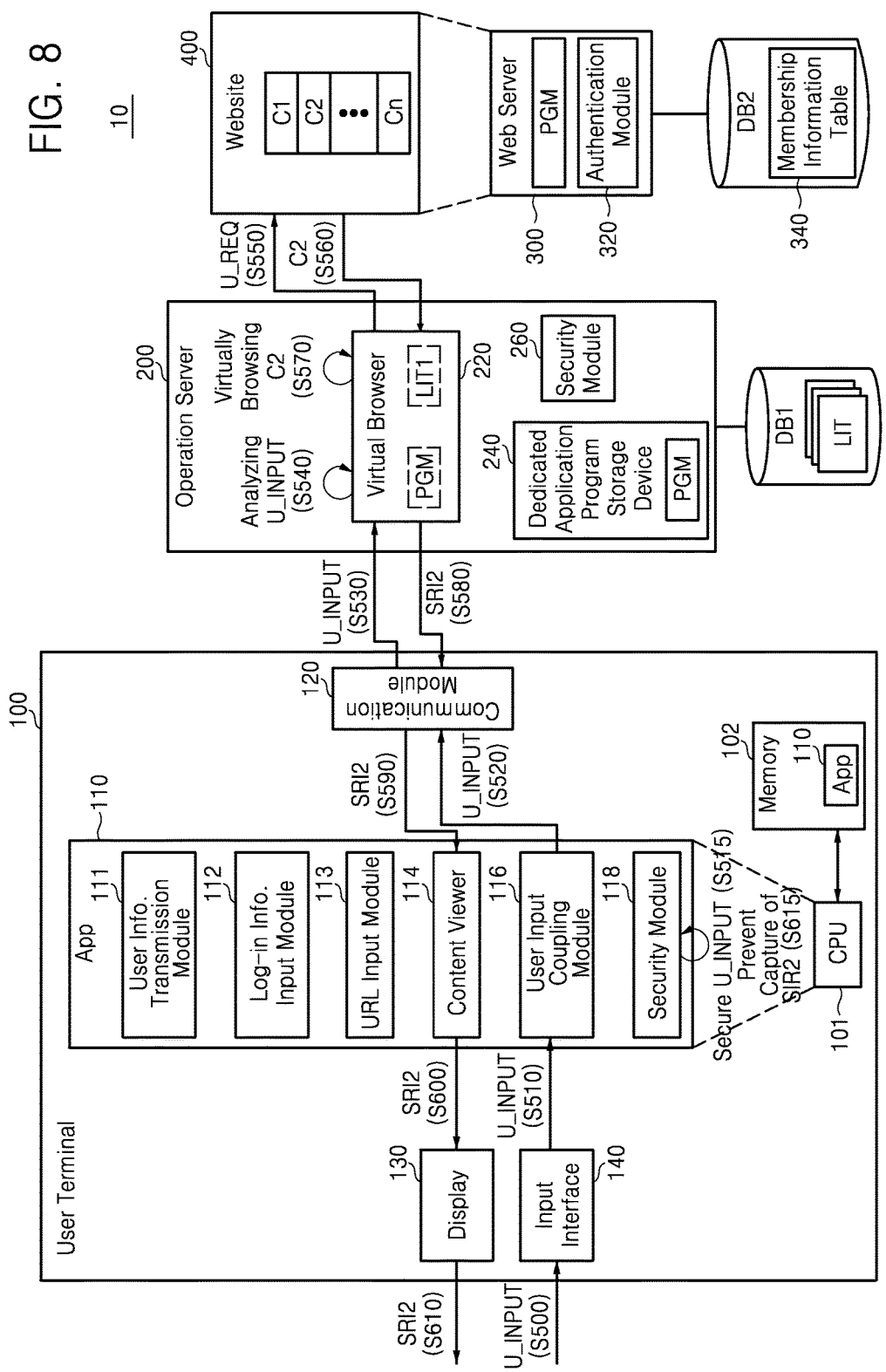

Referring to FIG. 8, when a user inputs a user input U_INPUT using the input interface 140 (S500), the input interface 140 may transmit the user input U_INPUT to the user input coupling module 116 (S510). At this time, the security module 118 may perform a security operation on the user input U_INPUT (S515). For example, the security operation may be an operation of encoding the user input U_INPUT or an operation of preventing another program from hooking the user input U_INPUT. The user input coupling module 116 may transmit the user input U_INPUT to the operation server 200 through the communication module 120 (S520 to S530).

The virtual browser 220 may analyze the received user input U_INPUT (S540). According to a result of the analysis, when the user input U_INPUT is a request U_REQ for a second content C2, the virtual browser 220 may transmit the request U_REQ for the second content C2 to the website 400 (S550).

When the website 400 transmits the second content C2 to the virtual browser 220 in response to the request U_REQ (S560), the browser 220 may download the second content C2 using the dedicated application program PGM, virtually browse the downloaded second content (S570), and generate a second browsing image SRI2 corresponding to a result of the browsing.

The virtual browser 220 may transmit the generated second browsing image SRI2 to the content viewer 114 through the communication module 120 (S580 to S590). The content viewer 114 may transmit the second browsing image SRI2 to the display 130 for a view, and the display 130 may display the received second browsing image SRI2 (S600 to S610). According to an exemplary embodiment, the content viewer 114 may transmit a GUI for a user input by the user to the display 130 based on the second browsing image SRI2, and the display 130 may display the second browsing image SRI2 and the GUI.

The security module 118 may perform a security operation which prevents a screen capture of the displayed second browsing image SRI2 (S615). That is, the browsing application 110 according to an exemplary embodiment of the present inventive concepts may automatically log in the website 400 using the operation server 200 without performing an additional log-in operation. Moreover, the browsing application 110 may receive and display only a browsing result image processed by the virtual browser 220 of the operation server 200.

A web browsing method according to an exemplary embodiment of the present inventive concepts can allow the operation server to provide a function of automatically logging in each of a plurality of websites using a database storing log-in information on each of the plurality of websites.

Moreover, the web browsing method according to an exemplary embodiment of the present inventive concepts can allow a dedicated application program for downloading or using a content of a website to be installed in the operation server, and allow the operation server to virtually browse a content downloaded from the website, and to transmit an image corresponding to a result of the browsing to a user terminal, thereby reducing a resource waste of the user terminal. In addition, a security module is embedded in an application performed in the user terminal according to an exemplary embodiment of the present inventive concepts, thereby eliminating security vulnerability in the user terminal which can be generated when the dedicated application program is a security program.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A web browsing method implemented by an operation server communicatively coupled to a user terminal and a database, the operation server comprising a virtual browser, the web browsing method comprising:
  receiving, by the operation server from the user terminal, user information for logging-in on the operation server;
  loading, by the virtual browser of the operation server, a log-in information table corresponding to the user information among a plurality of log-in information tables stored in the database accessed by the operation server, the log-in information table comprising a plurality of log-in information that provides a correspondence between uniform resource locaters (URLs), identifications, and passwords;
  accessing, by the operation server, a website using a URL of the website received from the user terminal to download a dedicated application program from a web server managing the website;
  installing, by the operation server, the dedicated application program within the operation server;
  transmitting, by virtual browser to the web server, log-in information for logging-in on the website based on the URL of the website, the log-in information being selected from the plurality of log-in information;
  automatically logging, by the virtual browser, into the website using the log-in information;
  downloading, by the virtual browser from the website, a first content based on a result of an authentication by the web server on the log-in information, the downloading of the first content requiring the dedicated application program to be installed on the operation server;
  generating, by the operation server, a first browsing image corresponding to the first content by virtually browsing the first content; and
  transmitting, by the operation server, the first browsing image to the user terminal,
  wherein the first content of the website is viewed without installing an application program in the user terminal and without performing a log-in operation on the website by the user terminal,
  wherein the dedicated application program installed in the operation server is performed by a call of the web server after the virtual browser accesses the website, and the virtual browser downloads or uses the first content using the dedicated application program being performed.

2. The web browsing method of claim 1, further comprising:
  receiving, by the operation server, an user input from the user terminal when the user input is input to the user terminal through an input interface included in the user terminal;
  generating, by the operation server, a second browsing image by processing, the received user input; and
  transmitting, by the operation server, the generated second browsing image to the user terminal.

3. The web browsing method of claim 2, wherein the generating the second browsing image includes:
  analyzing, by the operation server, the received user input to request a second content corresponding to a result of the analysis to the website;
  downloading, by the operation server, the second content from the website using the dedicated application program; and
  generating the second browsing image by virtually browsing the downloaded second content.

4. The web browsing method of claim 1, wherein the user information includes an ID and a password for logging-in of the user terminal to the operation server.

5. A web browsing method using an application installed in a user terminal communicatively coupled to an operation server, the user terminal comprising a display, the web browsing method comprising:
  transmitting, by the application to the operation server, user information for logging-in on the operation server to cause the operation server to load a log-in information table corresponding to the user information, the log-in information table being selected based on the user information from a plurality of log-in information tables stored in a database accessed by the operation server;
  transmitting, by the application, a URL of a website to the operation server to cause the operation server to:
    access, by a virtual browser of the operation server, the website using the URL,
    download a dedicated application program from a web server managing the website,
    installing the dedicated application program within the operation server,
    transmitting, by the virtual browser to the web server, log-in information for logging-in on the website, the log-in information being selected from a plurality of log-in information of the log-in information table based on the URL of the website,
    automatically log, by the virtual browser, into the website using the log-in information,
    receives a first content provided from the website based on a result of authentication, by the web server, on the log-in information, and
    generate a first browsing image by virtually browsing the received first content;
  receiving, by the application, the first browsing image from the operation server; and
  displaying, by the application, the first browsing image using a content viewer embedded in the application on the display,
  wherein the first browsing image is displayed without performing a log-in operation on the website by the user terminal,
  wherein the web server calls the dedicated application program installed in the operation server accessing the website, and when the dedicated application program is not installed in the operation server, the web server transmits the dedicated application program to the operation server to cause the dedicated application program to be installed in the operation server.

6. The web browsing method of claim 5, wherein the displaying further includes: preventing, by the application, the first browsing image from being captured using a security module embedded in the application.

7. The web browsing method of claim 5, further comprising:
- receiving, by the application, a user input which is input through an input interface included in the user terminal using a user input coupling module embedded in the application;
- transmitting, by the application, the received user input to the operation server;
- receiving, by the application, a second browsing image from the operation server when the operation server analyzes the received user input to request a second content corresponding to a result of the analysis to the website, receives the second content provided from the website using the dedicated application program, and generates the second browsing image by virtually browsing the received second content; and
- displaying, by the application, the received second browsing image.

8. The web browsing method of claim 7, further comprising:
- securing, by the application, the user input using a security module embedded in the application; and
- preventing, by the application, the second browsing image from being captured using the security module.

* * * * *